(12) United States Patent
Trivelpiece et al.

(10) Patent No.: US 11,256,972 B2
(45) Date of Patent: *Feb. 22, 2022

(54) SYSTEMS AND METHODS FOR PROVIDING TAGS ADAPTED TO BE INCORPORATED WITH OR IN ITEMS

(71) Applicant: Sensormatic Electronics, LLC, Boca Raton, FL (US)

(72) Inventors: Steve E. Trivelpiece, Rancho Santa Margarita, CA (US); Bjoern Petersen, Lubbock, TX (US); Adam S. Bergman, Boca Raton, FL (US); João Vilaça, Dubai (AE); Gopal Chandramowle, Boca Raton, FL (US); Carlos Gomez Garcia, Las Rozas (ES); Melwyn Sequeira, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/220,613

(22) Filed: Apr. 1, 2021

(65) Prior Publication Data

US 2021/0224627 A1 Jul. 22, 2021

Related U.S. Application Data

(63) Continuation of application No. 16/685,584, filed on Nov. 15, 2019, now Pat. No. 10,970,613.

(60) Provisional application No. 62/902,355, filed on Sep. 18, 2019.

(51) Int. Cl.
G06K 19/07 (2006.01)
G06K 7/00 (2006.01)
G06K 19/077 (2006.01)

(52) U.S. Cl.
CPC ..... *G06K 19/07758* (2013.01); *G06K 7/0095* (2013.01); *G06K 19/0772* (2013.01); *G06K 19/07756* (2013.01); *G06K 19/07771* (2013.01); *G06K 19/07773* (2013.01); *G06K 19/07788* (2013.01)

(58) Field of Classification Search
CPC ............ G06K 7/0095; G06K 19/0772; G06K 19/07756; G06K 19/07771
USPC ....................................................... 235/492
See application file for complete search history.

(56) References Cited

U.S. PATENT DOCUMENTS

2010/0230500 A1* 9/2010 Wilkinson ......... G06K 7/10178
235/492
2015/0269474 A1 9/2015 Finn et al.
2016/0365644 A1 12/2016 Finn et al.

* cited by examiner

*Primary Examiner* — Toan C Ly
(74) *Attorney, Agent, or Firm* — Arent Fox LLP

(57) ABSTRACT

Systems and methods for integrating tags with items. The methods comprise: dynamically determining a length of each metal thread to be incorporated into or trace to be disposed on a item to optimize tag performance in view of dielectric and tuning properties of the item. In the metal thread scenarios, the methods also involve: creating a metal thread having the length that was dynamically determined; and sewing the metal thread into the item being produced to form an antenna for a first tag. In the trace scenarios, the methods also involve forming the trace on the item being produced to form an antenna for a first tag. Next, at least a communications enabled device is attached to the item so as to form an electrical coupling or connection between the communications enabled device and the at least one antenna.

29 Claims, 13 Drawing Sheets

(Side View)

(Top View)

(Top View)

SYSTEMS AND METHODS FOR PROVIDING TAGS ADAPTED TO BE INCORPORATED WITH OR IN ITEMS

CROSS-REFERENCE TO RELATED APPLICATIONS

This application is a continuation of U.S. patent application Ser. No. 16/685,584 filed on Nov. 15, 2019, now U.S. Pat. No. 10,970,613, which claims priority to U.S. Provisional Patent Application Ser. No. 62/902,355 filed on Sep. 18, 2019. The contents of the referenced applications are incorporated herein in their entirety.

BACKGROUND

Statement of the Technical Field

The present disclosure relates generally to tags (e.g., Radio Frequency Identification ("RFID")/Car tags). More particularly, the present disclosure relates to implementing systems and methods for providing tags adapted to be incorporated with or in items (e.g., textile products).

Description of the Related Art

There are many RFID tags known in the art. Once such RFID tag comprises a Visual Source Tag ("VST") Item Level Intelligence ("ILI") hard tag made by Sensormatic Electronics, LLC of Florida. The VST ILI hard tag consist of an RFID tag attached to Polyethylene Terephthalate ("PET") substrate and encased in an Acrylonitrile Butadiene Styrene ("ABS") plastic housing. The VST ILI hard tag is hard to defeat by malicious individuals (e.g., thieves). However, the VST ILI hard tag is difficult to remove at Point Of Sale ("POS") systems. In order to address these drawbacks of the VST ILI hard tag, swing tickets have been created that contain RFID tags on PET and imbedded in paper. The problem with the swing ticket configuration is that the swing ticket be easily removed from the retail item without damaging the same, which results in less security from theft.

Therefore, it makes sense to insert an RFID tag directly into the retail item that the RFID tag is intended to protect. One such solution involves incorporating the RFID tag in a thread that can be sewn into cloth. Theoretically, this is an inexpensive solution that uses standard sewing techniques. However, the standard sewing techniques tend to damage the RFID tag causing failure rates of 1-20% that are not acceptable. Accordingly, a special machine has been employed required to install the RFID tag thread into cloth. In order to have physical strength, a wire is coated by a thick coating. Consequently, the RFID tag thread is able to be felt by someone touching the cloth and can be seen after the cloth has been ironed. In addition, this solution is relatively expensive.

Another solution includes placing RFID tags on care or brand labels of retail items. This label based solution has several drawbacks. For example, the care/brand labels have known locations and are easy to remove from the retail items using a cutting tool (e.g., scissors). Also, care/brand labels are usually small so the RFID tags antennas need to be meandered which reduces the RFID tag performance. If the care/brand label material has thickness or stiffness, then the care/brand labels will cause irritation to the individuals wearing the item. Finally, if the retail item is a garment for the upper body, then an individual might try to steal the garment by putting it on in a fitting room and wearing it out of the retail store without paying for the same. The back of a person's neck is a difficult location to try and read an RFID tag from an exit gate. Tag detection is much better if the RFID tag is installed in a seam of the garment.

SUMMARY

The present disclosure concerns implementing systems and methods for integrating tags with items. The methods can be performed while the item(s) is(are) being fabricated. IN some scenarios, the methods comprise: determining, by a computing device, dielectric and tuning properties of the item using a look up table or sensor data; dynamically determining, by the computing device, a length of each metal thread to be incorporated into an item to optimize tag performance in view of dielectric and tuning properties of the item; creating at least one metal thread having the length that was dynamically determined; sewing the at least one metal thread into the item being produced to form at least one antenna for a first tag; and attaching at least a communications enabled device to the item so as to form an electrical coupling or connection between the communications enabled device and the at least one antenna.

In some scenarios, the methods also comprise: adding at least one alignment marking on the item that can be used in the attaching to guide proper placement of the at least one communication enabled device on the item; coating one or both ends of the at least one metal thread with a substance selected to reduce or eliminate irritation caused by the at least one metal thread to an individual using the item; encasing the communications enabled device with a flexible fluid resistive material prior to the attaching; and/or attaching the communications enabled device to a piece of substrate prior to the attaching.

In those or other scenarios, the methods also comprise: validating that the tag is operating properly after the tag has been coupled to the item; replacing the communications enabled device with another communications enabled device when a validation is not made that the tag is operating properly; and/or tuning the at least one antenna by removing a portion of the at least one metal thread or replacing the at least one metal thread with another metal thread when a validation is not made that the first tag is operating properly.

The implementing systems comprise at least one device that: dynamically determines a length of each metal thread to be incorporated into an item to optimize tag performance in view of dielectric and tuning properties of the item; creates at least one metal thread having the length that was dynamically determined; sews the at least one metal thread into the item being produced to form at least one antenna for a first tag; and attaches at least a communications enabled device to the item so as to form an electrical coupling or connection between the communications enabled device and the at least one antenna.

Alternatively or additionally, the methods comprise: determining, by a computing device, dielectric and tuning properties of the item using a look up table or sensor data; dynamically determining, by the computing device, a length of each conductive trace to be formed directly on an item to optimize tag performance in view of dielectric and tuning properties of the item; forming each said conductive trace on the item being produced to form at least one antenna for a first tag; and attaching at least a communications enabled device to the item so as to form an electrical coupling or connection between the communications enabled device and the at least one antenna.

In some scenarios, the methods also comprise: adding at least one alignment marking on the item that can be used in the attaching to guide proper placement of the at least one communication enabled device on the item; encasing the communications enabled device with a flexible fluid resistive material prior to the attaching; attaching the communications enabled device to a piece of substrate prior to the attaching.

In those or other scenarios, the methods also comprise: validating that the first tag is operating properly after the first tag has been coupled to the item; replacing the communications enabled device with another communications enabled device when a validation is not made that the first tag is operating properly; and tuning the at least one conductive trace when a validation is not made that the first tag is operating properly.

The implementing systems comprise at least one device that: dynamically determines a length of each conductive trace to be formed directly on an item to optimize tag performance in view of dielectric and tuning properties of the item; forms each said conductive trace on the item being produced to form at least one antenna for a first tag; and attaches at least a communications enabled device to the item so as to form an electrical coupling or connection between the communications enabled device and the at least one antenna.

The device may further validate that the first tag is operating properly after the first tag has been coupled to the item. The communications enabled device may be replaced with another communications enabled device when a validation is not made that the first tag is operating properly. The conductive trace may additionally or alternatively be tuned when a validation is not made that the first tag is operating properly.

BRIEF DESCRIPTION OF THE DRAWINGS

The present solution will be described with reference to the following drawing figures, in which like numerals represent like items throughout the figures.

DETAILED DESCRIPTION

Figure 1:
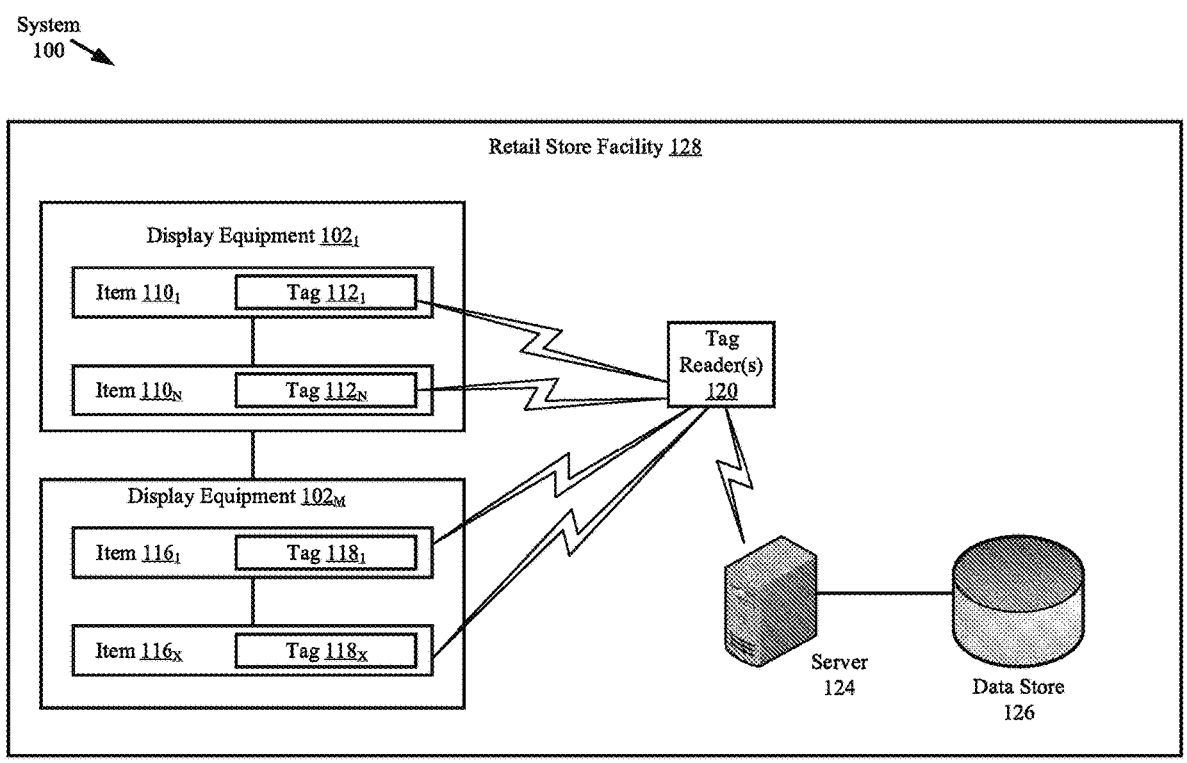
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "memory," "memory device," "data store," "data storage facility" and the like each refer to a non-transitory device on which computer-readable data, programming instructions (e.g., instructions 222 of FIG. 2, 322 of FIG. 3 and 1120 of FIG. 11) or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The present document concerns various solutions to address the drawbacks of conventional RFID tag solutions such as those disclosed in the background section of this document. One solution comprises a tag formed of a relatively thin, narrow, machine washable substrate on which electronic components are mounted or otherwise disposed. The substrate may also be lightweight and recyclable. The substrate can include, but is not limited to, a fabric, a plastic, and/or a paper. The substrate may comprise a polyester (e.g., PET) substrate, and/or be coated with a layer of a flexible fluid resistive material for protecting the same from damage due to fluid exposure. The flexible fluid resistive material can include, but is not limited to, a Thermoplastic Polyurethane ("TPU") material and/or a PET material. The flexible fluid resistive material may be a colored TPU which matches the color of items to which the tags are to be coupled. The electronic components can include, but are not limited to, a communication enable device having at least one antenna (e.g., an RFID enabled device). The tag is designed to be relatively thin so that it is hard to feel when incorporated into an item, but thick enough to withstand a certain number (e.g., 2-5) of wash cycles.

A plurality of tags may be fabricated using a single piece of narrow substrate (e.g., a ribbon). In this case, the electronic components may be coupled to the narrow substrate so as to be separated from each other with equal or unequal amounts of substrate. A coating may be applied to the narrow substrate with the electronic components coupled thereto. The narrow substrate may then be rolled or wound onto a reel. The reel is then inserted into a machine (e.g., a ribbon dispensing machine) for incorporating tags with item(s). The spacing between the electronic components is selected so that the machine is able to cut the narrow substrate while installing the tags in or incorporating the tags with items without any damage thereto. The thickness of the narrow substrate is selected so that the machine is able to hold the narrow substrate under tension on the reel while installing the tags in the items.

In some scenarios, the machine installation process involves: turning the reel by an amount that allows a portion of the narrow substrate that includes an electronic component to be rolled onto an item; cutting the narrow substrate at an end thereof so that a tag is placed or otherwise disposed on the item; and using a conventional sewing machine to sew at least one end of the tag onto the item. Notably, the tag is unable to be felt when sewn to the item.

Another solution comprises forming tag antennas by sewing metal thread(s) directly into an item at production time and/or by printing or disposing metal trace(s) directly on the garment at production time. The length(s) of the metal thread(s)/trace(s) are dynamically selected for optimizing tag performance in view of the item's dielectric and tuning properties. The item's dielectric and tuning properties include, but are not limited to, an impedance and/or capacitance. Next, the metal thread(s) or trace(s) is(are) sewn into, printed on, or disposed directly on the item. At least a communications enabled device is then attached to the item so as to form an electrical coupling or connection between the communication enabled device and the antenna(s). This technique for coupling a tag to an item provides a relatively inexpensive solution that is performed during the production of the item. Additionally, the metal thread(s) and/or trace(s) is(are) difficult to feel when incorporated into the item.

In some scenarios, the communications enabled device is coated with a flexible fluid resistive material or other substance so that the same is machine washable and/or water resistant. Additionally or alternatively, the ends of the metal thread(s) are coated with a substance selected to reduce or eliminate irritation caused by the metal thread(s) to an individual using the item.

Notably, the present solution provides significantly thinner tags as compared to conventional solutions. Some conventional tags include tags that are formed on a flexible narrow substrate. The tags have a 0.005 inch thickness. The flexible narrow substrate is strong enough such that it cannot be torn by an individual, but can be cut using a razor or scissor. Accordingly, a plurality of tags are formed on a single piece of narrow substrate. The narrow substrate is cut to separate the tags from each other. The separated tag(s) is(are) then coupled to item(s). When cut, the tags fold up onto themselves which is undesirable since antenna lengths are shortened whereby tag performance is affected.

Other conventional tags include an array of RFID tags glued to a PET roll. The PET roll is 0.002 inches thick. The RFID tag is about 0.008 inches thick. Leading to a total tag thickness of 0.015 inches. This tag is too thick for garment applications since the tag causes discomfort and irritation to the wearer of the garment.

The automated production assembly of the present solution allows for tags with significantly reduced dimensions. The present solution employs a substrate with a thickness between 0.0001 and 0.0005 inches. Although thin, this substrate maintains enough physical strength to handle the tension required to maintain the substrate on the roll. Tags on the order of 0.001 inches and smaller are placed on this substrate (which may have a width of 0.001 inches). The total thickness of the substrate/tag assembly is much smaller than that of the conventional solutions.

The present solution provides a roll technology that addresses the drawbacks of the conventional tags which roll up onto themselves. The tags of the present solution maintain their straightness or planar profiles so as to keep the antennas at the proper lengths. The tags of the present solution are so thin that they are not seen or felt when integrated into seams or other points in fabric items. The substrate of the present solution can include, but is not limited to, paper, PEP, PVC, or polymer.

Illustrative System

Referring now to FIG. 1, there is provided an illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which items need to be located and/or tracked.

The system 100 is generally configured to allow inventory counts of items located within a facility. As shown in FIG. 1, system 100 comprises a Retail Store Facility ("RSF") 128 in which display equipment $102_1, \ldots, 102_M$ (collectively referred to as "102") is disposed. The display equipment is provided for displaying items $110_1$-$110_N$ (collectively referred to as "110"), $116_1$-$116_X$ (collectively referred to as "116") to customers of the retail store. The display equipment can include, but is not limited to, shelves, article display cabinets, promotional displays, fixtures and/or equipment securing areas of the RSF 128. The RSF can also include emergency equipment (not shown), checkout counters, an EAS system (not shown), an RFID system, and/or an RFID/EAS system. Emergency equipment, checkout counters, video cameras, people counters, EAS systems, RFID systems, and/or RFID/EAS systems are well known in the art, and therefore will not be described herein.

At least one tag reader 120 is provided to assist in counting the items $110_1$-$110_N$, $116_1$-$116_X$ located within the RSF 128. The tag reader 120 comprises an RFID reader configured to read RFID tags. RFID readers are well known in the art. Any known or to be known RFID reader can be used herein without limitation. An illustrative tag reader will be discussed below in relation to FIG. 3.

Tags $112_1$-$112_N$ (collectively referred to as "112"), $118_1$-$118_X$ (collectively referred to as "118") are respectively attached or coupled to the items $110_1$-$110_N$, $116_1$-$116_X$. The tags are described herein as comprising single-technology tags that are only RFID enabled. The present solution is not limited in this regard. The tags can alternatively or additionally comprise dual-technology tags that have both EAS and RFID capabilities.

Notably, the tag reader 120 is strategically placed at a known location within the RSF 128. By correlating the tag reader's tag reads and the tag reader's known location within the RSF 128, it is possible to determine the location of items $110_1$, ..., $110_N$, $116_1$, ..., $116_X$ within the RSF 128. The tag reader's known coverage area also facilitates item location determinations. Accordingly, tag read information and tag reader location information is stored in a data store 126. This information can be stored in the data store 126 using a server 124. Servers are well known in the art, and therefore will not be described herein.

Figure 2:
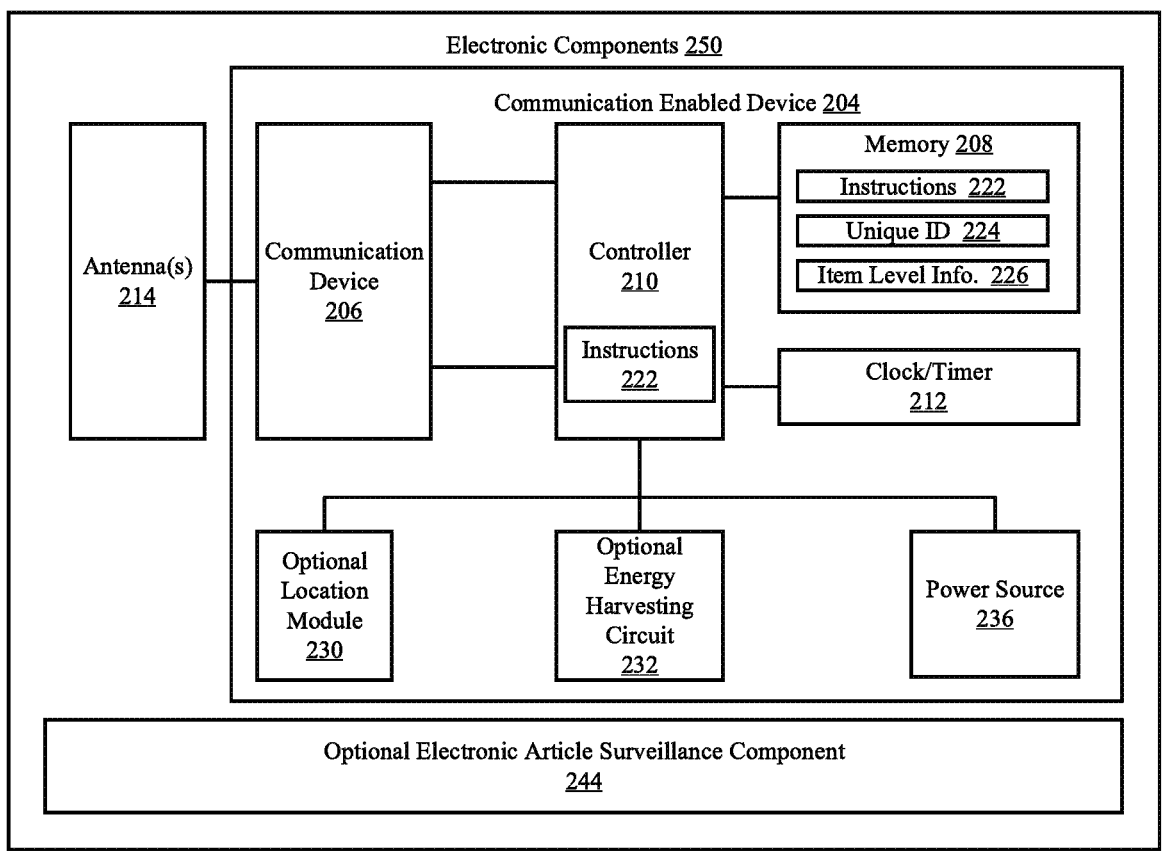
FIG. 2 is an illustration of an illustrative architecture for a tag.

Referring now to FIG. 2, there is an illustration of an illustrative architecture for a tag 200. Tags 112, 118 of FIG. 1 are the same as or similar to tag 200. As such, the discussion of tag 200 is sufficient for understanding the tags 112, 118 of FIG. 1.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology; WiFi technology; and/or beacon technology. Each of the listed wireless communication technologies is well known in the art, and therefore will not be described in detail herein. Any known or to be known wireless communication technology or other wireless communication technology can be used herein without limitation.

The components 204, 244 shown in FIG. 2 may be collectively referred to herein as electronic components 250. The components 206-212 shown in FIG. 2 may be collectively referred to herein as a communication enabled device 204, and include a memory 208 and a clock/timer 212. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

As shown in FIG. 2, the communication enabled device 204 is electrically coupled or connected to one or more antenna(s) 214 for allowing data to be exchanged with the external device via a wireless communication technology (e.g., an RFID technology, an NFC technology and/or a SRC technology). The antenna(s) 214 is(are) configured to receive signals from the external device and/or transmit signals generated by the communication enabled device 204. The antenna(s) 214 can comprise a near-field or far-field antenna. The antenna(s) include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., item 110 or 112 of FIG. 1) to which the tag 200 is coupled.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206. For example, the communication enabled device 204 can communicate information specifying a timestamp, a unique identifier for an item, item description, item price, a currency symbol, size information, sale information, and/or location information to an external device. The external device (e.g., server) can then store the information in a database (e.g., database 126 of FIG. 1) and/or use the information for various purposes.

The communication enabled device 204 also comprises a controller 210 (e.g., a CPU). The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The clock/timer 212 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The tag 200 can also include an optional EAS component 244. EAS components 244 are well known in the art, and therefore will not be described herein. Any known or to be known EAS component can be used herein without limitation.

As shown in FIG. 2, the tag 200 may also comprise a power source 236 and/or optional energy harvesting circuit 232. The power source 236 can include, but is not limited to, a rechargeable battery and/or a capacitor. The energy harvesting circuit 232 is configured to harvest energy from one or more sources (e.g., heat, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")).

Figure 3:
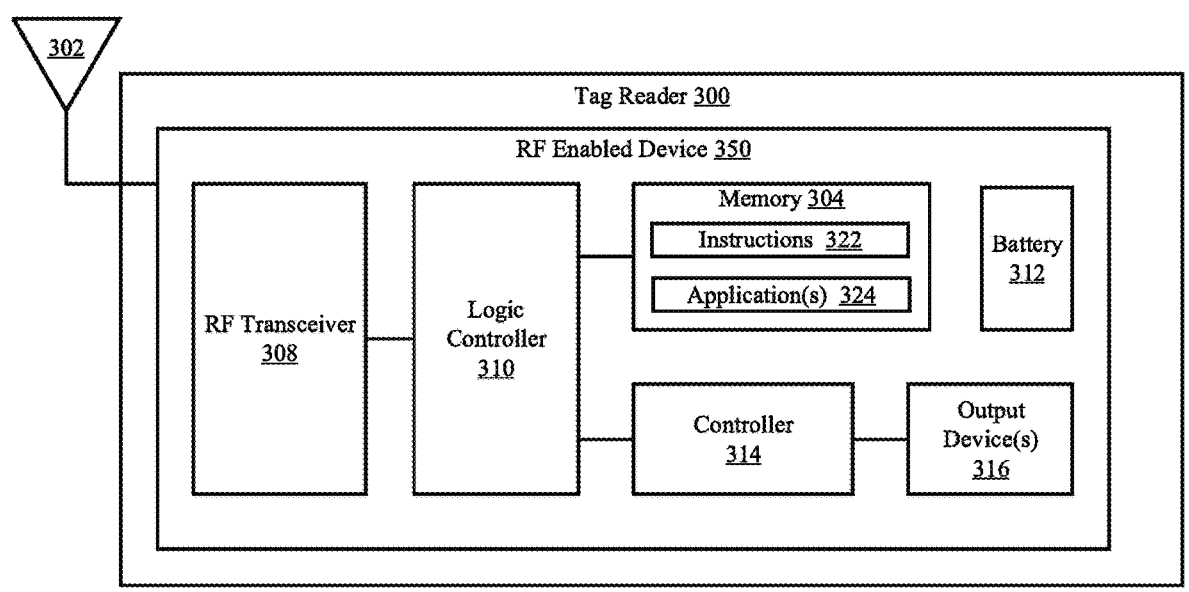
FIG. 3 is an illustration of an illustrative architecture for a tag reader.

Referring now to FIG. 3, there is provided a detailed block diagram of an illustrative architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate inventory counts and management within an RSF (e.g., RSF 128 of FIG. 1). In this regard, the tag reader 200 comprises an RF enabled device 350 for allowing data to be exchanged with an external device (e.g., tags 112, 118 of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise tags 112, 118 of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of a tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the tags within the facility. Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not tags are present within a facility, where the tags are located within a facility, and/or which tags are in motion at any given time. Other functions of the RF enabled device 350 will become apparent as the discussion progresses.

Illustrative Tag Architectures

Referring now to FIG. 4, there is provided an illustration of an illustrative architecture for a tag 400. Tag 400 may be the same as or similar to tag $112_1, \ldots, 112_N, 118_1, \ldots, 118_X$ of FIG. 1 or tag 200 of FIG. 2. As such, the discussion provided above in relation to tags 112, 118, 200 is sufficient for understanding the operations of tag 400. Notably, the tag 400 is designed to be relatively thin so that it is hard to feel when incorporated into an item (e.g., item $110_1, \ldots, 110_N, 116_1, \ldots,$ or $116_X$ of FIG. 1) to, but thick enough to withstand a certain number (e.g., 2-5) of wash cycles. The item can include, but is not limited to, a cloth item, a paper item, and/or a plastic item.

Figures 4A, 4B:
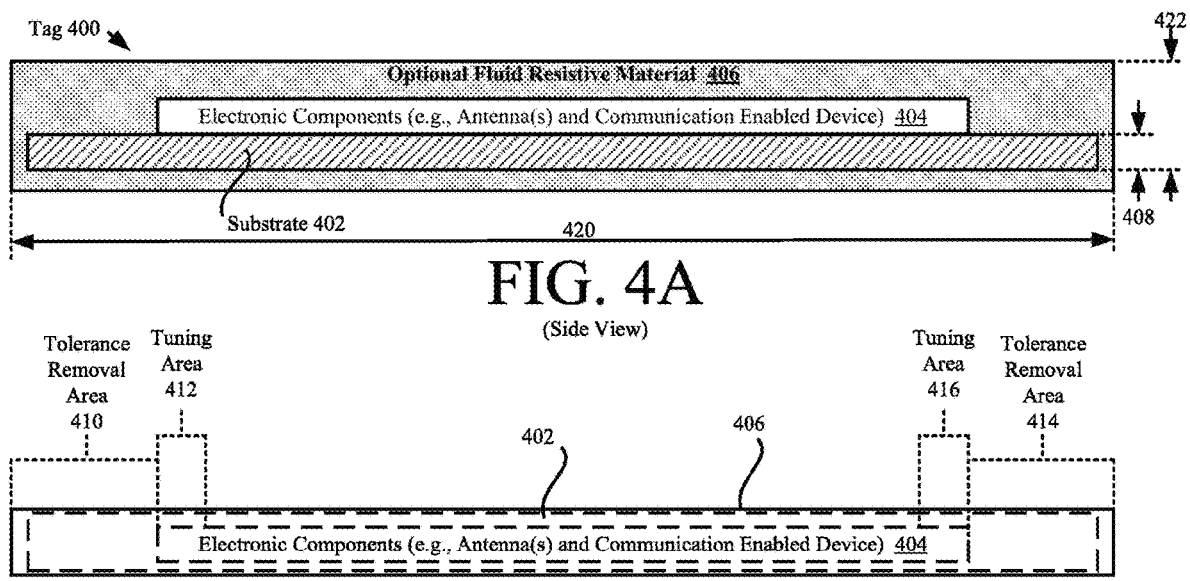
FIGS. 4A-4B (collectively referred to herein as "FIG. 4") provide illustrations showing an illustrative architecture for a tag.

As shown in FIG. 4A, tag 400 comprises a substrate 402 on which electronic components 404 are mounted, attached or disposed. The electronic components 404 can be the same as or similar to electronic components 250 of FIG. 2. Accordingly, the electronic components 404 can include antenna(s), a communication enabled device, and/or an EAS component.

The substrate 402 is a relatively thin, narrow, light weight, recyclable and/or machine washable substrate. The substrate 402 can include, but is not limited to, a fabric, a plastic, and/or a paper. The substrate 402 may comprise a polyester (e.g., PET) substrate. A thickness 408 of the substrate 402 is selected so that the substrate 402 has a physical strength that allows a machine to maintain tension on the same while incorporating or installing the tag on the item, and so that a metalized layer thereon creates antenna(s) for the tag. For example, thickness 408 can have a value between 0.0001 inches and 0.0025 inches. A width of the substrate 402 can be between 0.001 inches and 0.002 inches, which is small enough so that the tag is not felt by humans when incorporated into an item. The present solution is not limited to the particulars of this example.

In some scenarios, the substrate 402 and electronic components 404 are coated with a layer of a flexible fluid resistive material 406 for protecting the same from damage due to fluid exposure. The fluid resistive material 406 can include, but is not limited to, a TPU material and/or a PET material. The fluid resistive material 406 may be colored to match the color of the item (e.g., item $110_1, \ldots, 110_N$, $116_1, \ldots$, or $116_X$ of FIG. 1) to which the tag 400 is to be coupled.

Figure 5:
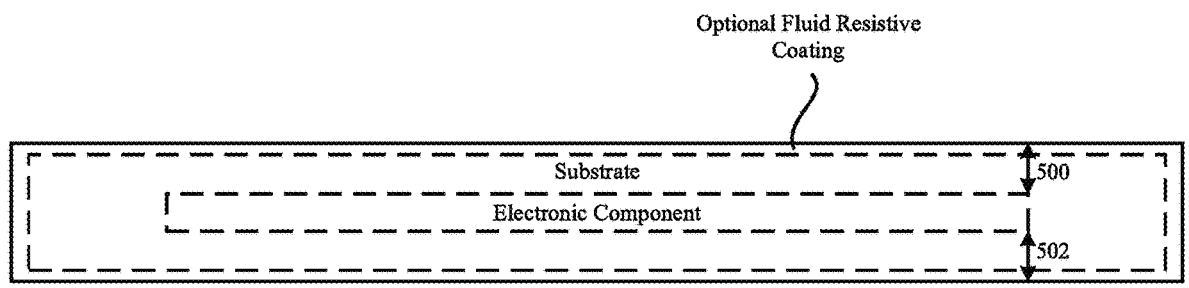
FIG. 5 provides an illustration of another illustrative architecture for a tag.

As shown in FIG. 4B, the tag 400 has tolerance removal areas 410, 414. Each tolerance removal area 410, 414 comprises an end portion of the substrate 402. These end portions of the substrate 402 facilitate the cutting and coupling of the tag 400 to the item (e.g., via stitching) without interference with and/or causing damage to the antenna(s). In some scenarios, additional substrate is provided on the elongate sides of the tag, as shown by arrows 500, 502 of FIG. 5.

In some scenarios, the antenna(s) of the electronic components 404 are formed as conductive trace(s) via ink printing and/or deposition (e.g., sputter deposition). Ink printing and deposition processes are well known in the art, and therefore will not be described herein. The antenna(s) can be linear, serpentine or otherwise meandering. In some scenarios, a length 420 of the tag 400 can be in the range of 140-170 mm when the antenna(s) is(are) linear or comprise straight line(s). In contrast, length 420 can be in the range of 60-150 mm when the antenna(s) is(are) serpentine or otherwise meandering. A thickness of the antenna(s) should be as thin as possible provided that the tag 400 has enough physical strength to withstand a given pulling force and/or a given number of wash cycles.

The antenna(s) may be designed so that the tag's operating frequency is in a range of 840-960 Mhz (inclusive of 840 and 960), a range of 860-940 Mhz (inclusive of 860 and 940), a range of 865-868 Mhz (inclusive of 865 and 868), or a range of 902-928 Mhz (inclusive of 902 and 928). The antenna(s) may additionally or alternatively comprise tuning area(s) 412, 416. Each tuning area 412, 416 comprises a portion of an antenna that can be modified for selectively and/or dynamically tuning an operating frequency of the tag (e.g., at the time of the tag's installation on the item in view of the item's dielectric and tuning properties). The tuning area can be modified by decreasing a thickness of the conductive material in that area. A laser, razor or other device can be used to precisely decrease the conductive material's thickness in the tuning area.

This tuning technique may not be needed if all items have similar dielectric properties. However, the items may be of the same type, but of different sizes. In this case, the tuning technique provides a way to optimize each stock-keeping unit in advance for the item to which the tag is to be installed on. The method to tune each antenna at installation time may be used if the volume was not high enough to produce separate stock-keeping units for each production run.

In other scenarios, the antenna(s) are formed by coupling physical wire(s) to the substrate 402. Each wire may have a diameter between 0.1 mm and 1 mm, and a length between 100 mm and 160 mm. The thickness and/or length of the wire(s) can be decreased at installation time to facilitate the dynamic tuning of the tag's operating frequency in view of the item's dielectric and tuning properties.

Figure 6:
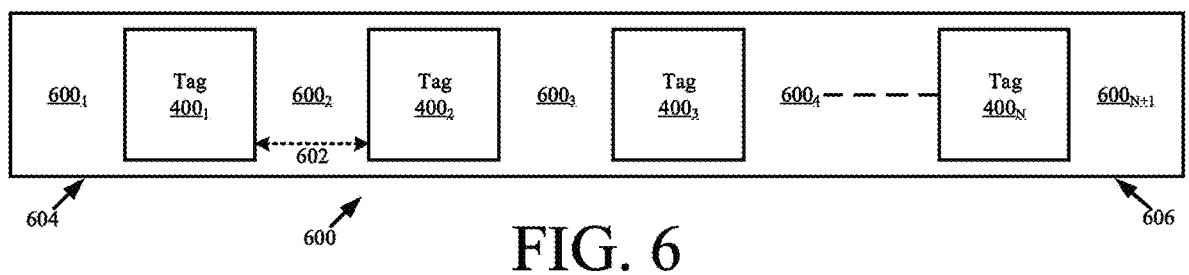
FIGS. 6-8 provide illustrations that are useful for understanding the present solution in which a plurality of tags are formed on a narrow substrate.

Referring now to FIG. 6, there is provided an illustration of an elongate narrow substrate 600 having a plurality of tags $400_1, 400_2, \ldots, 400_N$ coupled thereto. The elongate narrow substrate can include, but is not limited to, ribbon. Each tag $400_1, 400_2, \ldots, 400_N$ is the same as or similar to tag 400 of FIG. 4. Thus, the discussion of tag 400 is sufficient for understanding tags $400_1, 400_2, \ldots, 400_N$.

The tags $400_1, 400_2, \ldots, 400_N$ are arranged on the substrate 600 so as to have equal spacing 602 between adjacent ones thereof. The adjacent tags are spaced apart from each other so that a portion of the substrate $600_2, 600_3, 600_4$ resides therebetween, respectively. The first tag $400_1$ is also spaced from an end 604 of the substrate 600 by an amount defined by substrate portion $600_1$. Similarly, the last tag $600_N$ is spaced from an end 606 of the substrate 600 by an amount defined by substrate portion $600_{N+1}$. The substrate portions $600_1, \ldots, 600_{N+1}$ may constitute tolerance removal areas of tags (e.g., tolerance removal areas 410, 414 of FIG. 4B) as shown in FIG. 7, or alternatively may be provided in addition to the tag tolerance removal areas.

Figure 7:
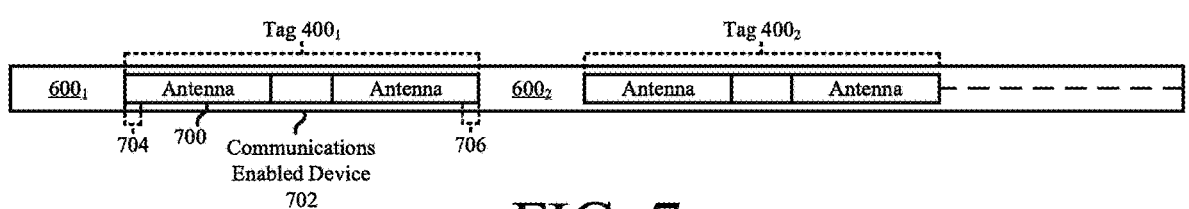

As shown in FIG. 7, each tag comprises two antennas 700 and a communication enabled device 702. Each antenna 700 has a tuning area 704 or 706. The antennas are the same as or similar to antenna(s) 214 of FIG. 2. The tuning areas 704, 706 are the same as or similar to tuning areas 412, 416 of FIG. 4. Each communication enabled device 702 is the same as or similar to communication enabled device 204 of FIG. 2. Thus, the discussions provided above in relation to 204, 214, 412, 416 are sufficient for understanding components 700-706 of FIG. 7.

Figure 8:

The present solution is not limited to the particulars of the architecture shown in FIGS. 6-7. In other scenarios, the tags are unequally spaced apart as shown in FIG. 8.

Figure 9:
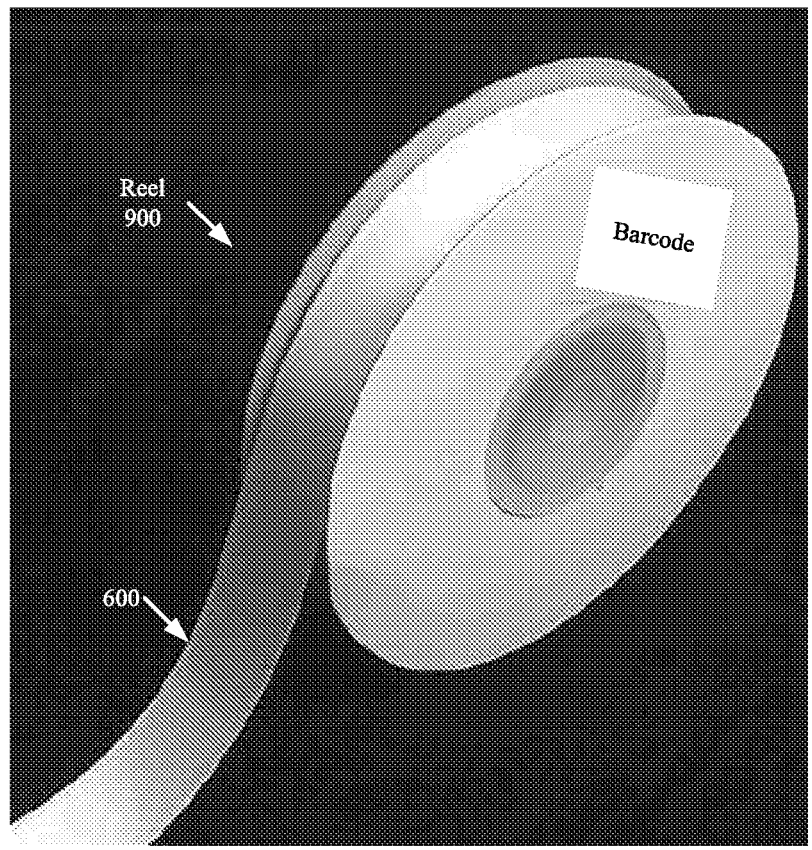
FIG. 9 provides an illustration showing a narrow substrate (with tags coupled thereto) that is rolled onto a reel.

Referring now to FIG. 9, there is provided an illustration showing a reel 900 onto which the substrate 600 is rolled. The reel 900 may be used to incorporate tags with items (e.g., during a relatively high volume manufacturing process). For example, during an item manufacturing process, the reel 900 is turned so that a tag is rolled onto an item. The substrate 600 is then cut within the tag's tolerance removal area so that the tag remains on the item for attachment thereto. This process is repeated for each item that is to have a tag incorporated therein.

Figure 10:
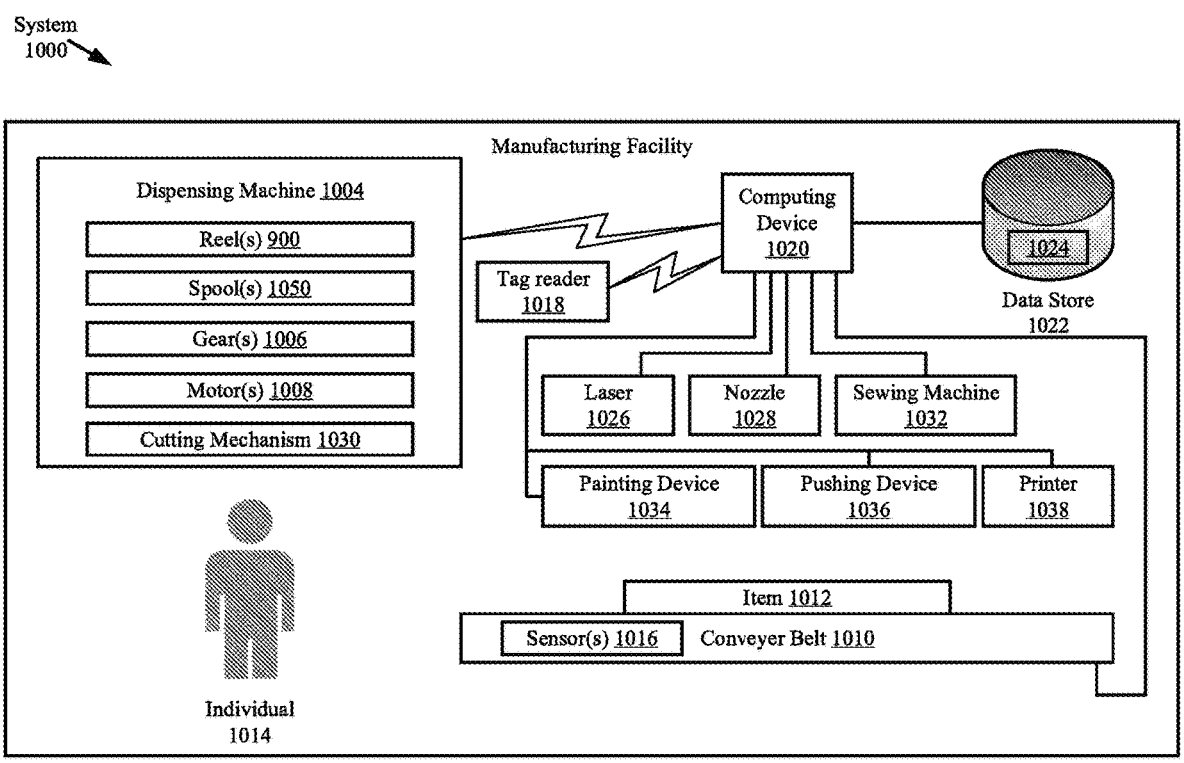
FIG. 10 provides an illustration showing an illustration system for incorporating tag(s) into item(s).

An illustration of an illustrative system 1000 for integrating or incorporating tags into or with items is provided in FIG. 10. As shown in FIG. 10, system 1000 comprises a dispensing machine 1004, a conveyer belt 1010, a tag reader 1018, a computing device 1020, a data store 1022, and a laser 1026. The tag reader 1018 can be the same as or similar to tag reader 300 of FIG. 3.

The dispensing machine 1004 is configured to receive the reel 900 and/or a spool 1050, and rotate the reel/spool in two opposing directions. The rotation is achieved using gear(s) 1006 and motor(s) 1008. The spool 1050 can include, but is not limited to, a spool of metal thread. Metal thread is well known in the art, and therefore will not be described herein.

As noted above, an elongate narrow substrate 600 is wound on the reel 900. The elongate narrow substrate comprises a plurality of tags $400_1, \ldots, 400_N$ coupled thereto. The elongate narrow substrate with the plurality of tags may be coated using a flexible fluid resistive material (e.g., flexible resistive material 406 of FIG. 4). The flexible fluid resistive material can have a color that matches a color of the item(s). Each of the tags comprises at least one antenna 700 formed of a trace or wire disposed on the elongate narrow substrate, and a communication enabled device 702 coupled to the elongate narrow substrate so as to have an electrical coupling or connection with the at least one antenna.

During a manufacturing process, a conveyer belt 1010 or an individual 1014 moves an item 1012 into proximity of the dispensing machine 1004. The computing device 1020 then controls the dispensing machine 1004 to turn the reel 900 by an amount that allows a portion of the ribbon 600 to be paid out. This portion of the ribbon 600 includes a tag comprising a communications enabled device and antenna(s).

The laser 1026 may then be controlled by the computing device 1020 to tune the antenna(s) of the tag (e.g., by removing ends of antenna wires and/or by decreasing the trace thickness in tuning areas of the antenna(s)). The tuning is performed for optimizing tag performance in view of the item's dielectric and tuning properties. The item's dielectric and tuning properties can be obtained using a Look Up Table ("LUT") 1024 and/or determined using sensor data generated by sensors 1016. Other devices can be used to tune the tag. Such other devices include, but are not limited to, a razor and/or a sewing machine.

The ribbon 600 is then cut by the cutting mechanism 1030 of the dispensing machine 1004 so that the paid out portion of the ribbon is placed on or otherwise disposed on the item. The cutting mechanism 1030 can include, but is not limited to, a razor and/or scissors. Razors and scissors are well known in the art, and therefore will not be described herein.

The portion of the ribbon is then coupled to the item so that the tag is incorporated with or in the item. For example, a nozzle 1028 dispenses an adhesive on the item 1012 and/or portion of ribbon, a heating element (not shown) applies heat to the portion of ribbon and/or item 1012, a sewing machine 1032 stitches at least part of the portion of ribbon to the item 1012, a pushing device 1034 pushes at least part of the portion of ribbon into the item 1012, and/or the sewing machine 1032 encloses the portion of ribbon within a cavity formed between the item 1012 and a layer of cloth (not shown). The layer of cloth may have a metal thread (not shown) for tuning an operating frequency of the tag disposed on the portion of ribbon. Nozzles, heating elements, sewing machines, pushing devices, and metal threads are well known in the art, and therefore will not be described herein. The present solution is not limited to the particulars of this example.

In some scenarios, the portion of the elongate narrow substrate can be painted by a painting device 1034 using paint with a color that matches a color of the item 1012. The paint can be applied prior to or subsequent to the cutting of ribbon 600.

At this time, proper operation of the tag may then optionally be validated. The validation can be achieved using the tag reader 1018. If the tag is operating properly, then other manufacturing operations are performed. In contrast, if the tag is not operating properly, then the tag is removed from the item, and a new tag is coupled to the item.

In some scenarios, system 1000 is additionally or alternatively configured to incorporate tags into items using a metal thread of spool 1050 to form the tag antenna(s). For example, the computing device 1020 performs operations to: determine the dielectric and tuning properties of the item using the LUT 1024 or sensor data generated by sensor(s) 1016; and/or dynamically determine a length of each metal thread that is to be incorporated into the item 1012 to optimize tag performance in view of dielectric and tuning properties of the item 1012. The cutting mechanism 1030 creates at least one metal thread having the length that was dynamically determined. One or both ends of the metal thread may be coated with a substance selected to reduce or eliminate irritation caused by the metal thread to an individual using the item 1012.

The sewing machine 1032 then sews the metal thread into the item 1012 being produced to form at least one antenna (e.g., antenna(s) 214 of FIG. 2) for the tag (e.g., tag $112_1, \ldots, 112_N, 118_1, \ldots, 118_X, 200$ of FIG. 2). The nozzle 1028 may then attach at least a communications enabled device (e.g., communications enabled device 204 of FIG. 2) to the item 1012 so as to form an electrical coupling or connection between the communications enabled device and the at least one antenna. The item 1012 may have at least one alignment marking that can be used in the attaching to guide proper placement of the at least one communication enabled device on the item 1012. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color). The communications enabled device may be encased with a flexible fluid resistive material, and/or attached to a piece of substrate prior to being attached to the item 1012.

At this point in the process, the tag reader 1018 may validate that the tag is operating properly. The communications enabled device may be replaced with another communications enabled device when a validation is not made that the first tag is operating properly. Additionally or alternatively, the metal thread is replaced with another metal thread when a validation is not made that the first tag is operating properly.

In those or other scenarios, system 1000 is additionally or alternatively configured to incorporate tags into items using conductive trace(s) to form the tag antenna(s). For example, the computing device 1020 performs operations to: determine the dielectric and tuning properties of the item using the LUT 1024 or sensor data generated by sensor(s) 1016; and/or dynamically determine a length of each conductive trace to be formed directly on the item 1012 to optimize tag performance in view of dielectric and tuning properties of the item 1012. Each conductive trace is disposed on the item being produced to form at least one antenna for a tag. The conductive traces can be printed on the item via a printer 1038 or deposited on the item by the nozzle 1028. Printers and nozzles are well known in the art, and therefore will not be described here.

The nozzle 1028 may then attach at least a communications enabled device (e.g., communications enabled device 204 of FIG. 2) to the item 1012 so as to form an electrical coupling or connection between the communications enabled device and the at least one antenna. The item 1012 may have at least one alignment marking that can be used in the attaching to guide proper placement of the at least one communication enabled device on the item 1012. The alignment markings can include, but are not limited to, shape(s) or line(s) printed on the item (e.g., in a color different than the item's color), shape(s) or line(s) created by stitching (e.g., using thread in a color different than the item's color), and/or shape(s) or line(s) formed using die(s) (e.g., a die with a color different than the item's color). The communications enabled device may be encased with a flexible fluid resistive material, and/or attached to a piece of substrate prior to being attached to the item 1012.

At this point in the process, the tag reader 1018 may validate that the tag is operating properly. The communications enabled device may be replaced with another communications enabled device when a validation is not made that the first tag is operating properly. Additionally or alternatively, the conductive trace(s) is(are) tuned when a validation is not made that the first tag is operating properly.

Figure 11:
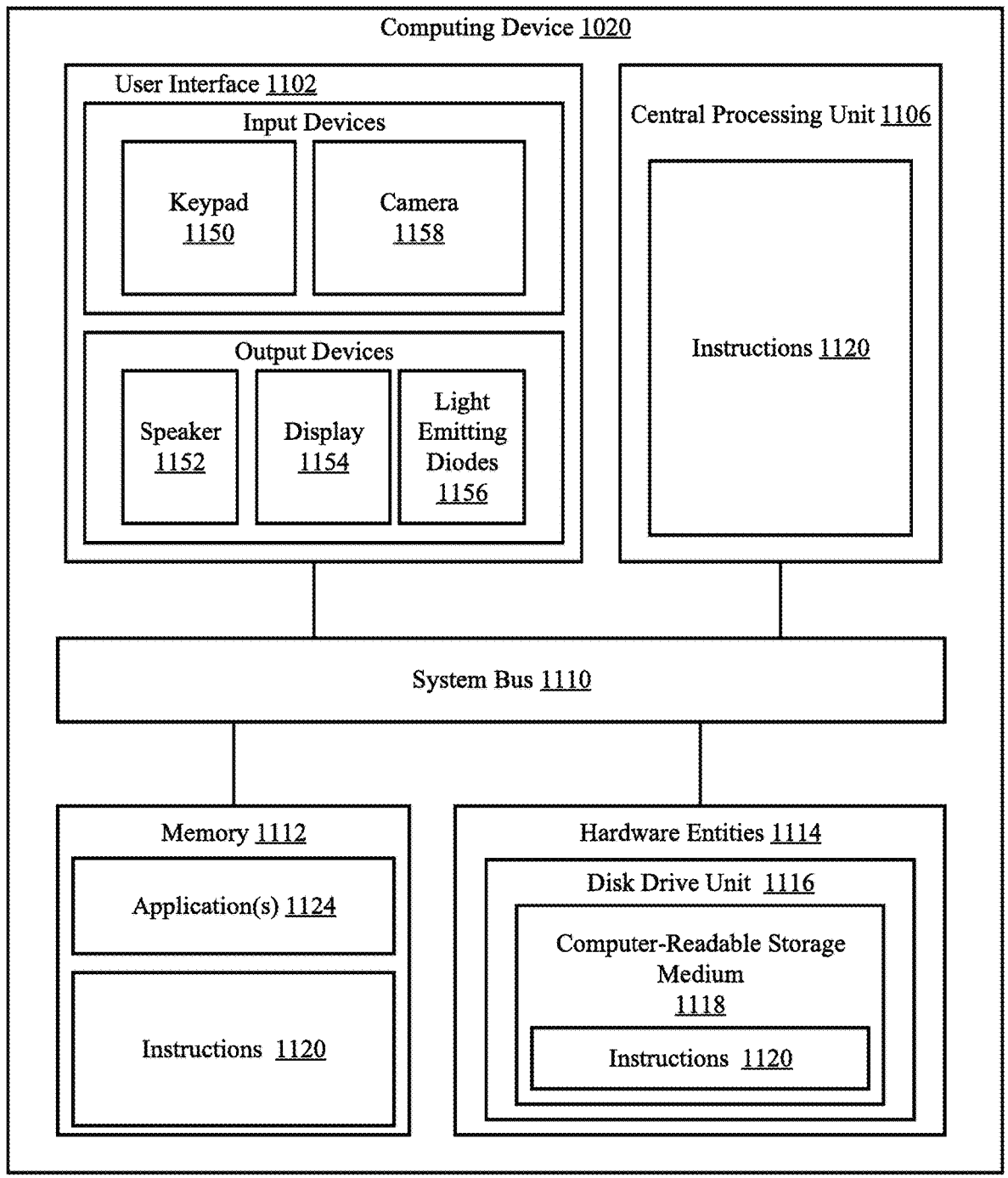
FIG. 11 provides a more detailed block diagram for the computing device shown in FIG. 10.

Referring now to FIG. 11, there is provided a detailed block diagram of an illustrative architecture for the computing device 1020 of FIG. 10. Computing device 1020 may include more or less components than those shown in FIG. 11. However, the components shown are sufficient to disclose an illustrative embodiment implementing the present solution. The hardware architecture of FIG. 11 represents one embodiment of a representative computing device configured to facilitate the incorporation of tags into and with items. As such, the computing device 1020 of FIG. 11 implements at least a portion of a method for incorporating tags into or with items in accordance with the present solution.

Some or all the components of the computing device 1020 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 11, the computing device 1020 comprises a user interface 1102, a Central Processing Unit ("CPU") 1106, a system bus 1110, a memory 1112 connected to and accessible by other portions of computing device 1020 through system bus 1110, and hardware entities 1114 connected to system bus 1110. The user interface can include input devices (e.g., a keypad 1150 and/or a camera 1158) and output devices (e.g., a speaker 1152, a display 1154, and/or Light Emitting Diodes ("LEDs") 1156), which facilitate user-software interactions for controlling operations of the computing device 1020.

At least some of the hardware entities 1114 perform actions involving access to and use of memory 1112, which can be a RAM, a disk driver and/or a Compact Disc Read Only Memory ("CD-ROM"). Hardware entities 1114 can include a disk drive unit 1116 comprising a computer-readable storage medium 1118 on which is stored one or more sets of instructions 1120 (e.g., software code) configured to implement one or more of the methodologies, procedures, or functions described herein. The instructions 1120 can also reside, completely or at least partially, within the memory 1112 and/or within the CPU 1106 during execution thereof by the computing device 1020. The memory 1112 and the CPU 1106 also can constitute machine-readable media. The term "machine-readable media", as used here, refers to a single medium or multiple media (e.g., a centralized or distributed database, and/or associated caches and servers) that store the one or more sets of instructions 1120. The term "machine-readable media", as used here, also refers to any medium that is capable of storing, encoding or carrying a set of instructions 1120 for execution by the computing device 1020 and that cause the computing device 1020 to perform any one or more of the methodologies of the present disclosure.

In some scenarios, the hardware entities 1114 include an electronic circuit (e.g., a processor) programmed for facilitating the incorporation of tags into items. In this regard, it should be understood that the electronic circuit can access and run application(s) 1124 installed on the computing device 1020 that implement the present solution.

Illustrative Methods for Incorporating Tags into/with Items

Figure 12:
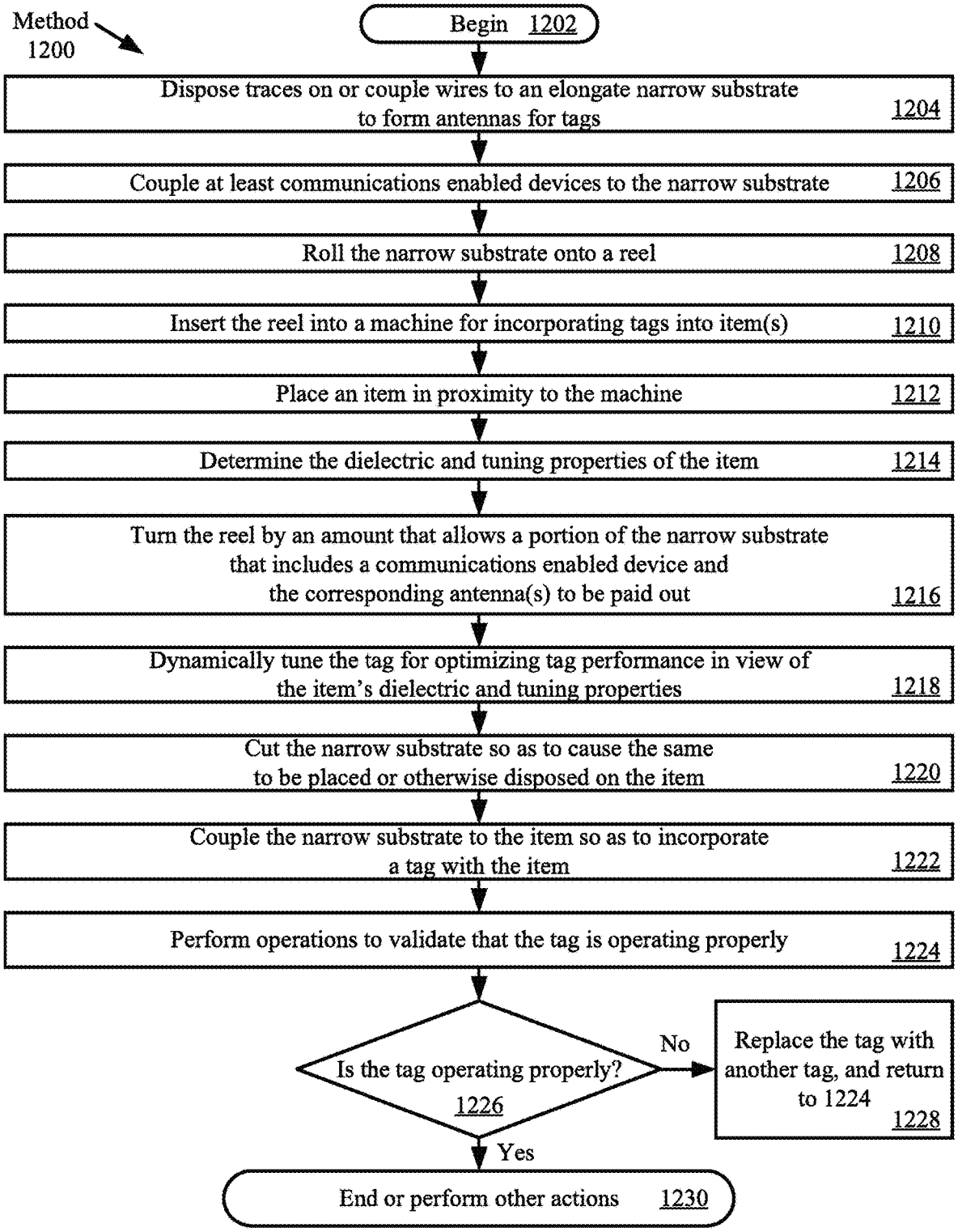
FIGS. 12-15 each provide a flow diagram of an illustrative method for incorporation of tag(s) into or with item(s).

Referring now to FIG. 12, there is provided a flow diagram of an illustrative method 1200 for incorporation of tag(s) (e.g., tag(s) 112, 118 of FIG. 1, 200 of FIG. 2, 400 of FIG. 4, and/or 400$_1$, ..., 400$_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example.

Method 1200 begins with 1202 and continues with 1204 where traces are printed on or wires are coupled to an elongate narrow substrate (e.g., substrate 402 of FIG. 4 or 600 of FIGS. 6-7) to form antennas (e.g., antenna(s) 214 of FIG. 2 or 700 of FIG. 7) for the tags. At least one communications enabled device (e.g., communication enabled device 204 of FIG. 2 or 702 of FIG. 7) is coupled to the narrow substrate in 1206. This coupling can be achieved via an adhesive and/or the application of heat.

Next in 1208, the narrow substrate is rolled onto a reel (e.g., reel 900 of FIG. 9). The reel is inserted into a machine for use in incorporating tags into the item, as shown by 1210. The machine can include, but is not limited to, a dispensing machine (e.g., ribbon dispensing machine 1004 of FIG. 10). Dispensing machines are well known in the art, and therefore will not be described herein. The reel may be rolled using gears (e.g., gear(s) 1006 of FIG. 10) and motors (e.g., motor(s) 1008 of FIG. 10). Gears and motors are well known in the art, and therefore will not be described herein.

In 1212, an item is placed in proximity to the machine. This can be achieved automatically by a conveyer belt (e.g., conveyer belt 1010) or manually by an individual (e.g., individual 1014 of FIG. 10). The item can be in a partially or fully manufactured state at this point in the process. The dielectric and tuning properties of the item are then determined in 1214. This determination can be made by a computing device using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

The reel is then turned in 1216 by an amount that allows a portion of the narrow substrate (e.g., portion 600$_1$ and at least portion of 600$_2$ of FIGS. 6-7) that includes a communications enabled device and the corresponding antenna(s) (e.g., tag 400$_1$ of FIGS. 6-7) to be paid out. The tag is dynamically tuned in 1218 for optimizing tag performance in view of the item's dielectric and tuning properties determined in 1214. The tuning can be achieved by: (1) decreasing a thickness of the antenna trace(s) disposed on the narrow substrate (e.g., using a laser or razer); (2) clipping one or more ends of the antenna wires coupled to the narrow substrate; and/or (3) sewing metal thread(s) into the item at location(s) where the tag(s) are to reside. The metal thread(s) create capacitance and inductance that tune the tag's operating frequency.

Next in 1220, the narrow substrate is cut (e.g., in portion 600$_2$ of FIGS. 6-7) so as to cause the same to be placed on or otherwise disposed on the item. The cutting of the narrow substrate can be achieved via a cutting mechanism (e.g., cutting mechanism 1030 of FIG. 10) of the dispensing machine. The cutting mechanism can include, but is not limited to, a razer or scissors. The narrow substrate is then coupled to the item so as to incorporate the tag in or with the item, as shown by 1222. This coupling can be achieved via an adhesive, an application of heat, and/or stitching.

Upon completing 1222, operations are performed in 1224 to validate that the tag is operating properly. The validation can be achieved using a tag reader (e.g., tag reader 1018 of FIG. 10). Tag readers are well known in the art, and therefore will not be described herein. The tag reader can transmit interrogation signals to the tag, wait for a response signal from the tag, receive the response signal, and process the response signal. The proper operation of the tag may be validated when the response signal is received in a given amount of time after the interrogation signal transmission, and/or the response signal includes certain information (e.g., a tag identifier).

If a validation is not made that the tag is operating properly [1226:NO], then method 1200 continues with 1228 where the tag is removed from the item and a new tag is coupled to the item. Once the new tag is coupled to the item, method 1200 returns to 1224 where operation of the new tag is tested during a validation process. In contrast, if a validation is made that the tag is operating properly [1226:YES], then 1230 is performed where method 1200 ends or other actions are taken (e.g., finish manufacturing/fabricating the item and/or return to 1204 to incorporate a tag in a next item).

In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used to remove all or part of the tag from the item prior to when the item is removed from the facility.

Figure 13:
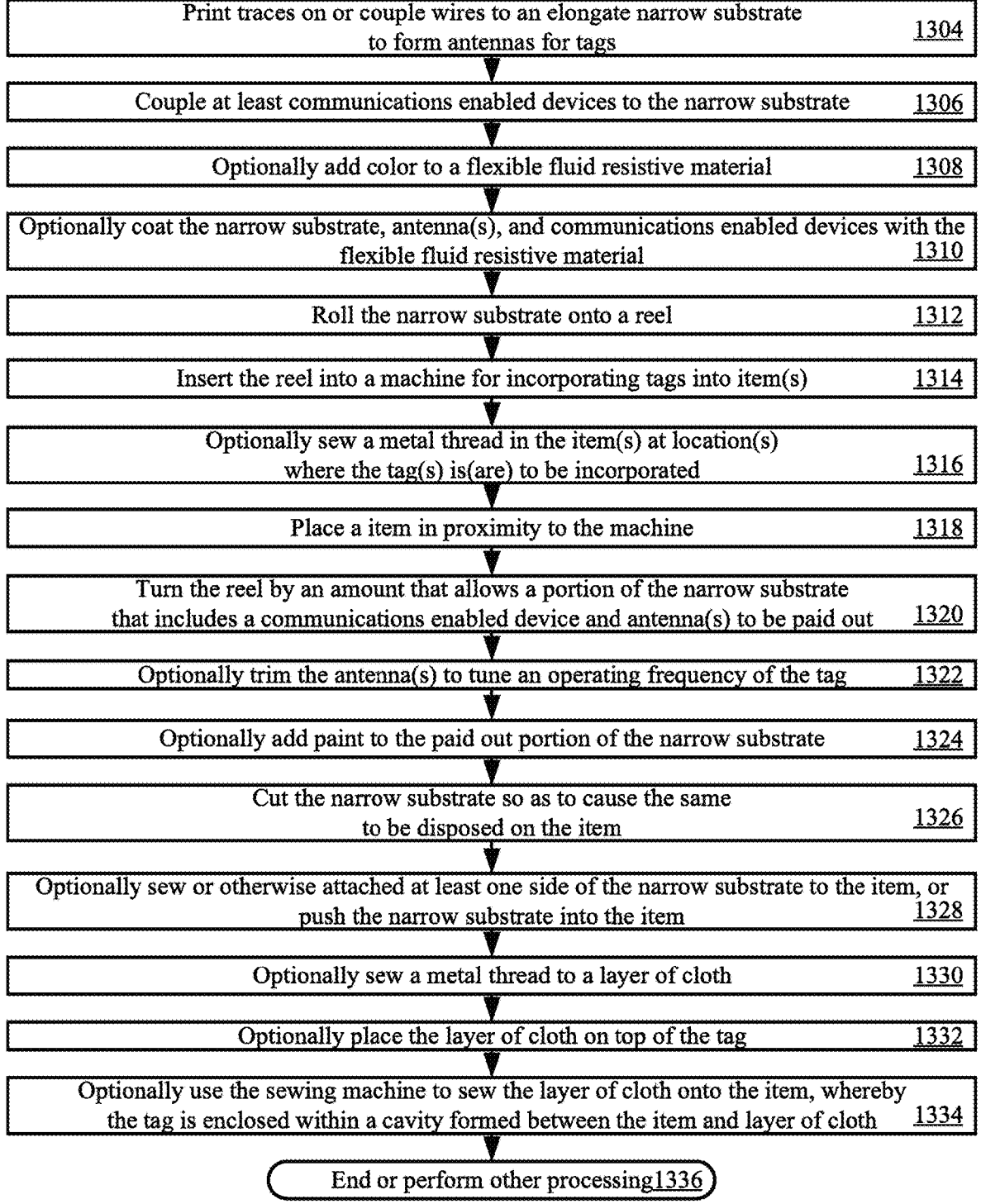

Referring now to FIG. 13, there is provided a flow diagram of an illustrative method 1300 for incorporation of tag(s) (e.g., tag(s) 112, 118 of FIG. 1, 200 of FIG. 2, 400 of FIG. 4, and/or 400$_1$, . . . , 400$_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example.

Method 1300 begins with 1302 and continues with 1304 where traces are printed on or wires are coupled to an elongate narrow substrate (e.g., substrate 402 of FIG. 4 or 600 of FIGS. 6-7) to form antennas (e.g., antenna(s) 214 of FIG. 2 or 700 of FIG. 7) for the tags. At least one communications enabled device (e.g., communication enabled device 204 of FIG. 2 or 702 of FIG. 7) is coupled to the narrow substrate in 1306. This coupling can be achieved via an adhesive and/or the application of heat.

Next in 1308, color is optionally added to a flexible fluid resistive material. The color may be selected so that the color of the flexible fluid resistive material matches the color of item(s) to which tag(s) is(are) to be coupled. The flexible fluid resistive material (colored or clear) may then optionally be used to coat the narrow substrate, antenna(s) and communication enabled device(s), as shown by 1310.

In 1312, the narrow substrate is rolled onto a reel (e.g., reel 900 of FIG. 9). The reel is inserted into a machine for use in incorporating tags into the item, as shown by 1314. The machine can include, but is not limited to, a dispensing machine (e.g., ribbon dispensing machine 1004 of FIG. 10). Dispensing machines are well known in the art, and therefore will not be described herein. The reel may be rolled using gears (e.g., gear(s) 1006 of FIG. 10) and motors (e.g., motor(s) 1008 of FIG. 10). Gears and motors are well known in the art, and therefore will not be described herein.

In 1316, metal thread(s) is(are) optionally sewn into the item at location(s) where the tag(s) is(are) to be incorporated. The metal thread(s) create capacitance and inductance for tuning the tag(s) so as to provide optimized tag performance in view of the item's dielectric and tuning properties (e.g., impedance). The dielectric and tuning properties of the item may be determined in 1316. This determination can be made by a computing device using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein. The metal threads allow for custom tuning of each item by having different sized metal threads sewn into the items. The metal threads also provide a way to increase the capacitance or inductance from a simple trace/wire antenna so that it has better impedance matching with the communications enabled device and better RF performance.

In 1318, an item is placed in proximity to the machine. This can be achieved automatically by a conveyer belt (e.g., conveyer belt 1010) or manually by an individual (e.g., individual 1014 of FIG. 10). The item can be in a partially or fully manufactured state at this point in the process.

The reel is then turned in 1320 by an amount that allows a portion of the narrow substrate (e.g., portion 600$_1$ and at least portion of 600$_2$ of FIGS. 6-7) that includes a communications enabled device and the corresponding antenna(s) (e.g., tag 400$_1$ of FIGS. 6-7) to be paid out. The antenna(s) are optionally tuned in 1322 for optimizing tag performance in view of the item's dielectric and tuning properties. The tuning can be achieved by decreasing a thickness of the antenna trace(s) disposed on the narrow substrate (e.g., using a laser or razer), or clipping one or more ends of the antenna wires coupled to the narrow substrate.

In 1324, paint is optionally added to the paid out portion of the narrow substrate. 1324 can be performed as an alternative to 1308 where color is added to the flexible fluid resistive material. The paint is selected so that the color of the painted tag matches the color of the item.

In 1326, the narrow substrate is cut (e.g., in portion 600$_2$ of FIGS. 6-7) so as to cause the same to be placed on or otherwise disposed on the item. The cutting of the narrow substrate can be achieved via a cutting mechanism (e.g., cutting mechanism 1030 of FIG. 10) of the dispensing machine. The cutting mechanism can include, but is not limited to, a razer or scissors. The narrow substrate is then coupled to the item so as to incorporate the tag in or with the item, as shown by 1328-1334. As shown by 1328, at least one side of the narrow substrate is sewn or otherwise attached to the item (e.g., via an adhesive or an application of heat). Alternatively, the narrow substrate is pushed into the item. As shown by 1330-1334, the narrow substrate may additionally or alternatively be enclosed within a cavity formed between the item and a layer of cloth. The layer of cloth can be coupled to the item via a sewing machine. In some scenarios, a metal thread is sewn into the layer of cloth for tuning the operating frequency of the tag. Upon coupling the tag to the item and/or validating the tag's performance, 1336 is performed where method 1300 ends or other actions are taken (e.g., finish manufacturing/fabricating the item and/or return to 1304 to incorporate a tag in a next item).

In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used to remove all or part of the tag from the item prior to when the item is removed from the facility.

Figure 14:
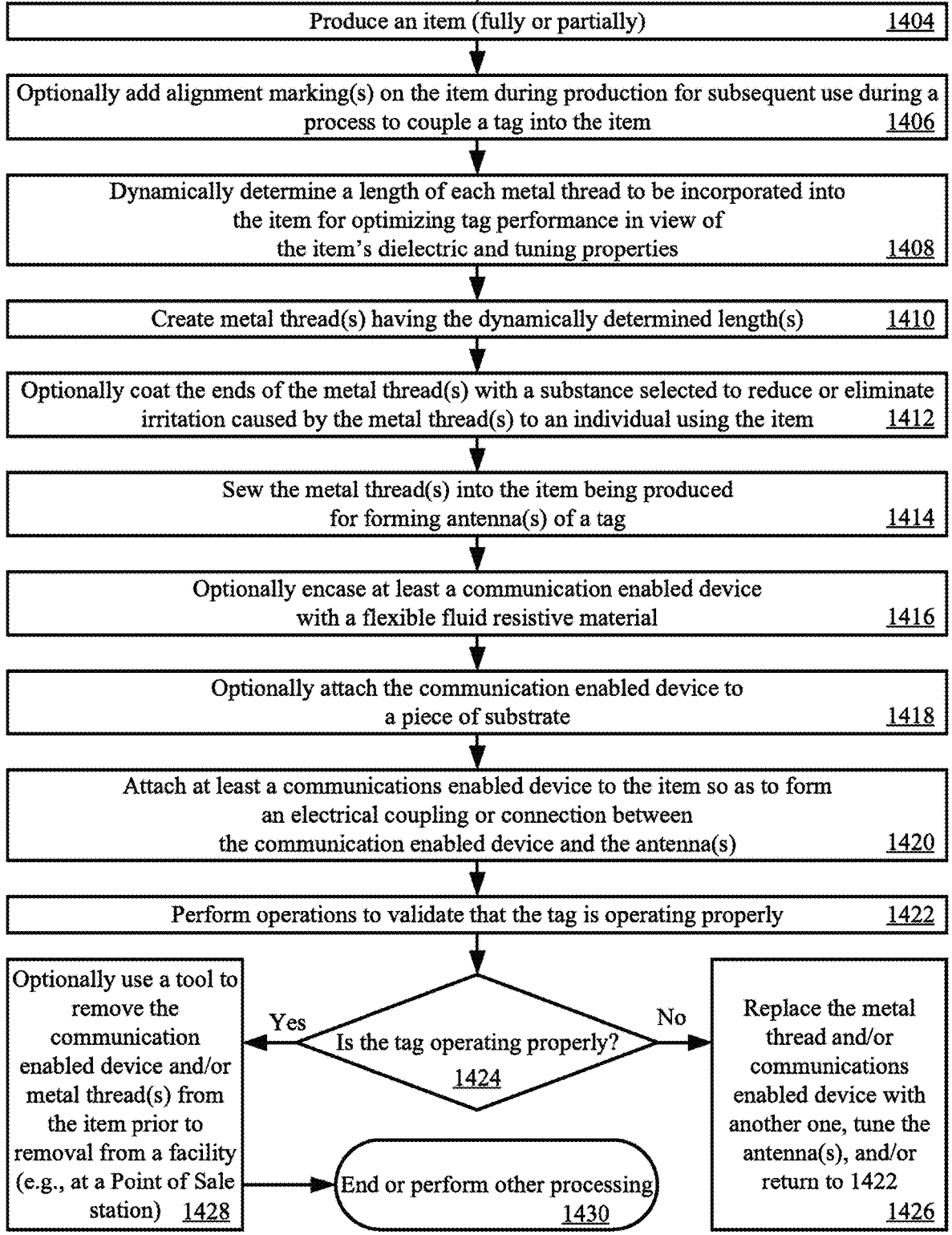

Referring now to FIG. 14, there is provided a flow diagram of an illustrative method 1400 for incorporation of tag(s) (e.g., tag(s) 112, 118 of FIG. 1, 200 of FIG. 2, 400 of FIG. 4, and/or 400$_1$, . . . , 400$_N$ Of FIG. 6) into or with item(s) (e.g., item(s) 110, 116 of FIG. 1 and/or item 1012 of FIG. 10). For example, a tag is incorporated into a seam, a hem or an overlapping fabric edge finish of a garment or hat. The present solution is not limited to the particulars of this example.

Method 1400 begins with 1402 and continues with 1404 where an item (e.g., item 1012 of FIG. 10) is fully or partially produced. Alignment marking(s) is(are) optionally added to the item in 1406. The alignment markings can be used in a subsequent process to couple a tag (e.g., tag 200 of FIG. 2) to the item. In this regard, the alignment markings can clearly show where the tag is to be placed on the item, and help guide such placement. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color).

In 1408, a length of each metal thread that is to be incorporated into the item to form a tag antenna (e.g., antenna 214 of FIG. 2) is dynamically determined. The length of each metal thread can be selected for optimizing tag performance based on the dielectric and tuning properties of the item (e.g., item 1012 of FIG. 10). The dielectric and tuning properties of the item may be determined by a computing device (e.g., computing device 1020 of FIG. 10) using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

In 1410, metal thread(s) having the dynamically determined length(s) is(are) created. This can involve cutting piece(s) of metal thread from a spool of metal thread (e.g., spool 1050 of FIG. 10) using a cutting mechanism (e.g., cutting mechanism 1030 of FIG. 10) and/or tuning each piece of metal thread by cutting one or more ends thereof (e.g., using cutting mechanism 1030 of FIG. 10 and/or a laser 1026 of FIG. 10). Ends of the metal thread(s) are optionally coated in 1412 with a substance selected to reduce or eliminate irritation caused by the metal thread(s) to an individual using the item. The metal thread(s) is(are) then sewn by a sewing machine (e.g., sewing machine 1032 of FIG. 10) into the item being produced for forming tag antenna(s) (e.g., antenna(s) 214 of FIG. 2), as shown by 1414. Notably, the metal thread(s) is(are) very difficult to feel in the item.

In 1416, at least a communication enabled device (e.g., communication enabled device 204 of FIG. 2) is optionally encased with a flexible fluid resistive material (e.g., flexible fluid resistive material 406 of FIG. 4A). The flexible fluid resistive material may be clear or colored. The color of the flexible fluid resistive material may be selected so that it matches the color of the item to which the tag is being incorporated. The color may be added to the flexible fluid resistive material in 1416.

In 1418, the communication enabled device is optionally attached to a piece of substrate (e.g., PET or Mylar) (e.g., substrate 402 of FIG. 4A). This attachment can be achieved via an adhesive, an application of heat, and/or stitching. The piece of substrate is provided to facilitate the attachment of the communication enabled device to the item.

In 1420, the communication enabled device is attached to the item so as to form an electrical coupling or connection between the communication enabled device and the metal thread antenna(s). This attachment can be achieved via an adhesive, an application of heat and/or stitching. The electrical coupling can include, but is not limited to, an inductive coupling.

Upon completing 1420, operations are performed in 1422 to validate that the tag is operating properly. The validation can be achieved using a tag reader (e.g., tag reader 1018 of FIG. 10). Tag readers are well known in the art, and therefore will not be described herein. The tag reader can transmit interrogation signals to the tag, wait for a response signal from the tag, receive the response signal, and process the response signal. The proper operation of the tag may be validated when the response signal is received in a given amount of time after the interrogation signal transmission, and/or the response signal includes certain information (e.g., a tag identifier).

If a validation is not made that the tag is operating properly [1424:NO], then method 1400 continues with 1426 where the metal thread(s) and/or communications enabled device is(are) removed from the item and a new one(s) thereof is(are) coupled to the item. Additionally or alternatively, the antenna(s) is(are) tuned by removing at least a portion of each metal thread (e.g., by removing a free end of each metal thread). Once these actions are taken, method 1400 returns to 1422 where operation of the tag is tested during a validation process.

In contrast, if a validation is made that the tag is operating properly [1424:YES], then 1428 and/or 1430 is(are) performed. In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used in 1522 to remove the communication enabled device, device mounting assembly and/or metal thread(s) from the item prior to when the item is removed from the facility. Subsequently, 1430 is performed where method 1400 ends or other actions are performed (e.g., finish manufacturing/fabricating the item and/or return to 1402 to incorporate a tag in a next item).

Figure 15:
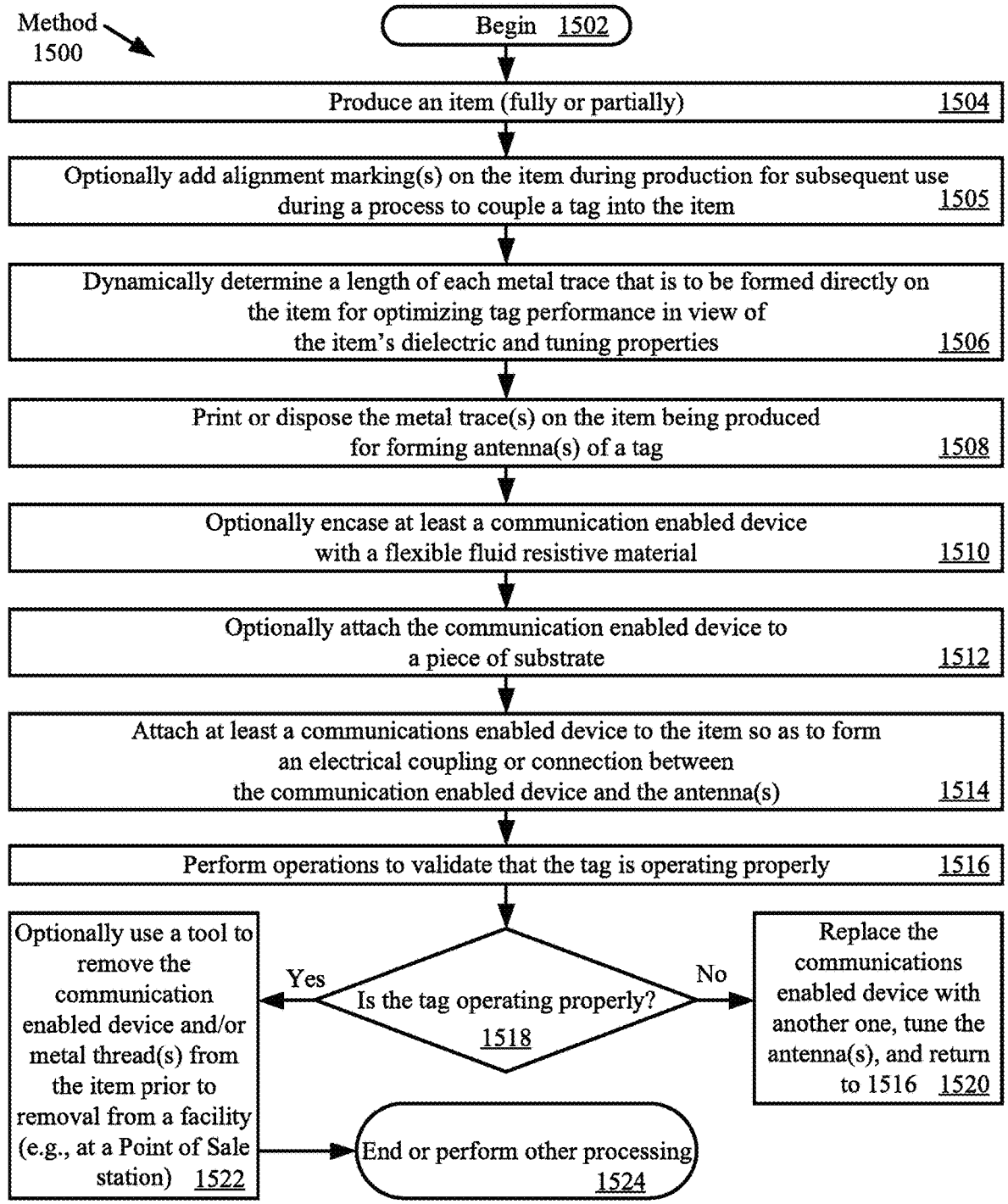

Referring now to FIG. 15, there is provided a flow diagram of an illustrative method 1500 for incorporation of tag(s) (e.g., tag(s) 112, 118 of FIG. 1, 200 of FIG. 2, 400 of FIG. 4, and/or 400$_1$, . . . , 400$_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example.

Method 1500 begins with 1502 and continues with 1504 where an item (e.g., item 1012 of FIG. 10) is fully or partially produced. Alignment marking(s) is(are) optionally added to the item in 1505. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color). The alignment markings can be used in a subsequent process to couple a tag to the item. In this regard, the alignment markings can clearly show where some or all components of the tag are to be placed on the item, and help guide such placement.

In 1506, a length of each metal trace that is to be disposed directly on the item to form a tag antenna (e.g., antenna 214 of FIG. 2) is dynamically determined. The length of each metal trace can be selected for optimizing tag performance based on the dielectric and tuning properties of the item. The dielectric and tuning properties of the item may be determined by a computing device (e.g., computing device 1020 of FIG. 10) using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

In 1508, metal trace(s) having the dynamically determined length(s) is(are) printed or otherwise disposed on the item so as to form the tag antenna(s). The metal trace(s) may optionally be tuned after being printed or otherwise disposed on the item. The tuning can be achieved by decreasing a thickness of a metal trace at one or more ends thereof (e.g., using a laser 1026 of FIG. 10). The metal traces can be formed of any suitable material, such as copper. The metal traces can be otherwise disposed on the item in accordance with any known or to be known deposition technique (e.g., sputtering).

In 1510, at least a communication enabled device (e.g., communication enabled device 204 of FIG. 2) is optionally encased with a flexible fluid resistive material (e.g., flexible fluid resistive material 406 of FIG. 4A). The flexible fluid resistive material may be clear or colored. The color of the flexible fluid resistive material may be selected so that it matches the color of the item to which the tag is being incorporated. The color may be added to the flexible fluid resistive material in 1510.

In 1512, the communication enabled device is optionally attached to a piece of substrate (e.g., PET or Mylar) (e.g., substrate 402 of FIG. 4A). This attachment can be achieved via an adhesive, an application of heat, and/or stitching. The substrate can facilitate the attachment of the communication enabled device to the item.

In 1514, the communication enabled device is attached to the item so as to form an electrical coupling or connection between the communication enabled device and the metal trace antenna(s). This attachment can be achieved via an adhesive, an application of heat and/or stitching. The electrical coupling can include, but is not limited to, an inductive coupling.

Upon completing 1514, operations are performed in 1516 to validate that the tag is operating properly. The validation can be achieved using a tag reader (e.g., tag reader 1018 of FIG. 10) and/or computing device (e.g., computing device 1020 of FIG. 10). Tag readers are well known in the art, and therefore will not be described herein. The tag reader can transmit interrogation signals to the tag, wait for a response signal from the tag, receive the response signal, and process the response signal. An output of the tag reader may optionally be provided to the computing device for processing. The proper operation of the tag may be validated when the response signal is received in a given amount of time after the interrogation signal transmission, and/or the response signal includes certain information (e.g., a tag identifier).

If a validation is not made that the tag is operating properly [1518:NO], then method 1500 continues with 1520 where the communications enabled device is removed from the item and a new communications enabled device is coupled to the item. The antenna(s) may also be tuned in 1520 by decreasing a thickness of each conductive trace of a given portion thereof (e.g., of a free end). Once the new tag is coupled to the item, method 1500 returns to 1516 where operation of the new tag is tested during a validation process.

In contrast, if a validation is made that the tag is operating properly [1518:YES], then 1522 and/or 1524 is(are) performed. In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used in 1522 to remove the communication enabled device, device mounting assembly and/or metal thread(s) from the item prior to when the item is removed from the facility. Subsequently, 1524 is performed where method 1500 ends or other actions are performed (e.g., finish manufacturing/fabricating the item and/or return to 1502 to incorporate a tag in a next item).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for integrating tags with items, comprising:
    dynamically determining, by a computing device during a fabrication of an item, a length of each metal thread to be incorporated onto or into the item to improve tag performance in view of dielectric and tuning properties of the item;
    creating, during the fabrication of the item, at least one metal thread having the length;
    disposing, during the fabrication of the item, the at least one metal thread onto or into the item being produced to form at least one antenna for a first tag; and
    attaching at least a communications enabled device to the item after disposing the at least one metal thread onto or into the item so as to form an electrical coupling or connection between the communications enabled device and the at least one antenna.

2. The method according to claim 1, further comprising determining the dielectric and tuning properties of the item using a look up table or sensor data, prior to dynamically determining the length of the at least one metal thread.

3. The method according to claim 1, further comprising adding at least one alignment marking on the item that can be used in the attaching to guide proper placement of the communications enabled device on the item.

4. The method according to claim 1, further comprising coating one or both ends of the at least one metal thread with a substance selected to reduce or eliminate irritation caused by the at least one metal thread to an individual using the item.

5. The method according to claim 1, further comprising encasing the communications enabled device with a flexible fluid resistive material prior to the attaching.

6. The method according to claim 1, further comprising attaching the communications enabled device to a piece of substrate prior to the attaching.

7. The method according to claim 1, further comprising validating that the first tag is operating properly after the first tag has been coupled into or onto the item.

8. The method according to claim 7, further comprising replacing the communications enabled device with another communications enabled device when the validating fails.

9. The method according to claim 7, further comprising tuning the at least one antenna by removing a portion of the at least one metal thread or replacing the at least one metal thread with another metal thread when the validating fails.

10. The method according to claim 1, wherein the attaching is performed while the item is being fabricated.

11. A method for integrating tags with items, comprising:
dynamically determining, by a computing device, a thickness of conductive trace to be formed on or in an item to improve tag performance in view of dielectric and tuning properties of the item;
forming each said conductive trace, based on the dynamically determining, on or in the item being produced to form at least one antenna for a first tag; and
attaching at least a communications enabled device to the item after forming each said conductive trace so as to form an electrical coupling or connection between the communications enabled device and the at least one antenna.

12. The method according to claim 11, further comprising determining the dielectric and tuning properties of the item using a look up table or sensor data, prior to dynamically determining the thickness of the conductive trace.

13. The method according to claim 11, further comprising adding at least one alignment marking on the item that can be used in the attaching to guide proper placement of the communications enabled device on the item.

14. The method according to claim 11, further comprising encasing the communications enabled device with a flexible fluid resistive material prior to the attaching.

15. The method according to claim 11, further comprising attaching the communications enabled device to a piece of substrate prior to the attaching.

16. The method according to claim 11, further comprising validating that the first tag is operating properly after the first tag has been coupled with the item.

17. The method according to claim 16, further comprising replacing the communications enabled device with another communications enabled device when the validating fails.

18. The method according to claim 16, further comprising tuning the conductive trace when the validating fails.

19. The method according to claim 11, wherein the dynamically determining, forming and attaching are performed while the item is being fabricated.

20. A system, comprising:
at least one device that:
dynamically determines, during a fabrication of an item, a length of each metal thread to be incorporated into or onto an item to improve tag performance in view of dielectric and tuning properties of the item;
creates, during the fabrication of the item, at least one metal thread having the length;
disposes, during the fabrication of the item, the at least one metal thread into or onto the item being produced to form at least one antenna for a first tag; and
attaches at least a communications enabled device after disposing the at least one metal thread into or onto the item so as to form an electrical coupling or connection between the communications enabled device and the at least one antenna.

21. The system according to claim 20, wherein the dielectric and tuning properties of the item are determined using a look up table or sensor data, prior to dynamically determining the length of the at least one metal thread.

22. The system according to claim 20, wherein the item has at least one alignment marking that can be used in the attaching to guide proper placement of the communication enabled device on the item.

23. The system according to claim 20, wherein one or both ends of the at least one metal thread is coated with a substance selected to reduce or eliminate irritation caused by the at least one metal thread to an individual using the item.

24. The system according to claim 20, wherein the communications enabled device is encased with a flexible fluid resistive material.

25. The system according to claim 20, wherein the communications enabled device is attached to a piece of substrate prior to being attached to the item.

26. The system according to claim 20, wherein the at least one device further validates that the first tag is operating properly after the first tag has been attached to the item.

27. The system according to claim 26, wherein the communications enabled device is replaced with another communications enabled device when the validation fails.

28. The system according to claim 26, wherein the at least one metal thread is replaced with another metal thread when the validation fails.

29. The system according to claim 20, wherein the first tag is integrated with the item while the item is being fabricated.

* * * * *

UNITED STATES PATENT AND TRADEMARK OFFICE
CERTIFICATE OF CORRECTION

| | |
|---|---|
| PATENT NO. | : 11,256,972 B2 |
| APPLICATION NO. | : 17/220613 |
| DATED | : February 22, 2022 |
| INVENTOR(S) | : Steve E. Trivelpiece |

Page 1 of 1

It is certified that error appears in the above-identified patent and that said Letters Patent is hereby corrected as shown below:

In the Specification

Column 1, Line 40, delete "be" and insert -- can be --, therefor.

Column 10, Line 55, delete "$116_1, \ldots,$ or $116_X$" and insert -- $116_1, \ldots, 116_X$ --, therefor.

Column 11, Line 22, delete "$116_1, \ldots,$ or $116_X$" and insert -- $116_1, \ldots, 116_X$ --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*